US006297741B1

(12) United States Patent
Higgins

(10) Patent No.: US 6,297,741 B1
(45) Date of Patent: Oct. 2, 2001

(54) MECHANISM FOR RETAINING A REMOVABLE ELEMENT IN A MOUNTING STRUCTURE

(75) Inventor: Paul D. Higgins, Glen Mills, PA (US)

(73) Assignee: Vibro-Meter S.A., Fribourg (CH)

( * ) Notice: Subject to any disclaimer, the term of this patent is extended or adjusted under 35 U.S.C. 154(b) by 0 days.

(21) Appl. No.: 09/350,559

(22) Filed: Jul. 9, 1999

(51) Int. Cl.⁷ .................................................. G08B 17/10
(52) U.S. Cl. ........................ 340/631; 439/318; 439/335; 439/337
(58) Field of Search ...................... 340/631, 596, 340/595, 450.2, 450.3; 73/304 R; 200/51.08, 51.13, 51.14; 439/332, 333, 335, 299, 311, 314, 316, 318, 319; 324/200, 204

(56) References Cited

U.S. PATENT DOCUMENTS

| 2,729,800 | * | 1/1956 | Knudsen | 439/335 |
|---|---|---|---|---|
| 3,753,442 | | 8/1973 | Tauber | 137/15 |
| 4,072,385 | * | 2/1978 | Wallner | 339/88 R |
| 4,305,180 | * | 12/1981 | Schwartz | 339/90 R |
| 4,359,256 | * | 11/1982 | Gallusser et al. | 339/90 R |
| 4,429,938 | * | 2/1984 | Flor | 339/90 R |
| 4,737,119 | * | 4/1988 | Stieler | 439/318 |
| 5,029,973 | * | 7/1991 | Rink | 439/335 |
| 5,046,961 | * | 9/1991 | Hoffman | 439/337 |
| 5,782,141 | | 7/1998 | Schoolcraft | 74/606 R |
| 5,877,690 | * | 3/1999 | Tally | 340/631 |

FOREIGN PATENT DOCUMENTS

| 761420 | 11/1956 | (GB) . |
|---|---|---|
| 2 155 985 | 10/1985 | (GB) . |
| 2 280 895 | 2/1995 | (GB) . |

\* cited by examiner

*Primary Examiner*—John A. Tweel, Jr.
(74) *Attorney, Agent, or Firm*—Woodcock Washburn Kurtz Mackiewicz & Norris LLP

(57) ABSTRACT

A chip detector includes a probe having a locking portion and a housing that receives the probe. The housing comprises two lugs. The lugs engage a corresponding pair of slots defined in the locking portion when the probe is fully inserted in the housing. In particular, a first contact surface on the locking portion abuts a first sidewall on the lug when the probe is fully inserted, thereby securely coupling the probe to the housing. A second contact surface on the locking portion abuts a second sidewall on the lug when the probe is fully inserted, thus preventing the probe from rotating in relation to the housing.

18 Claims, 7 Drawing Sheets

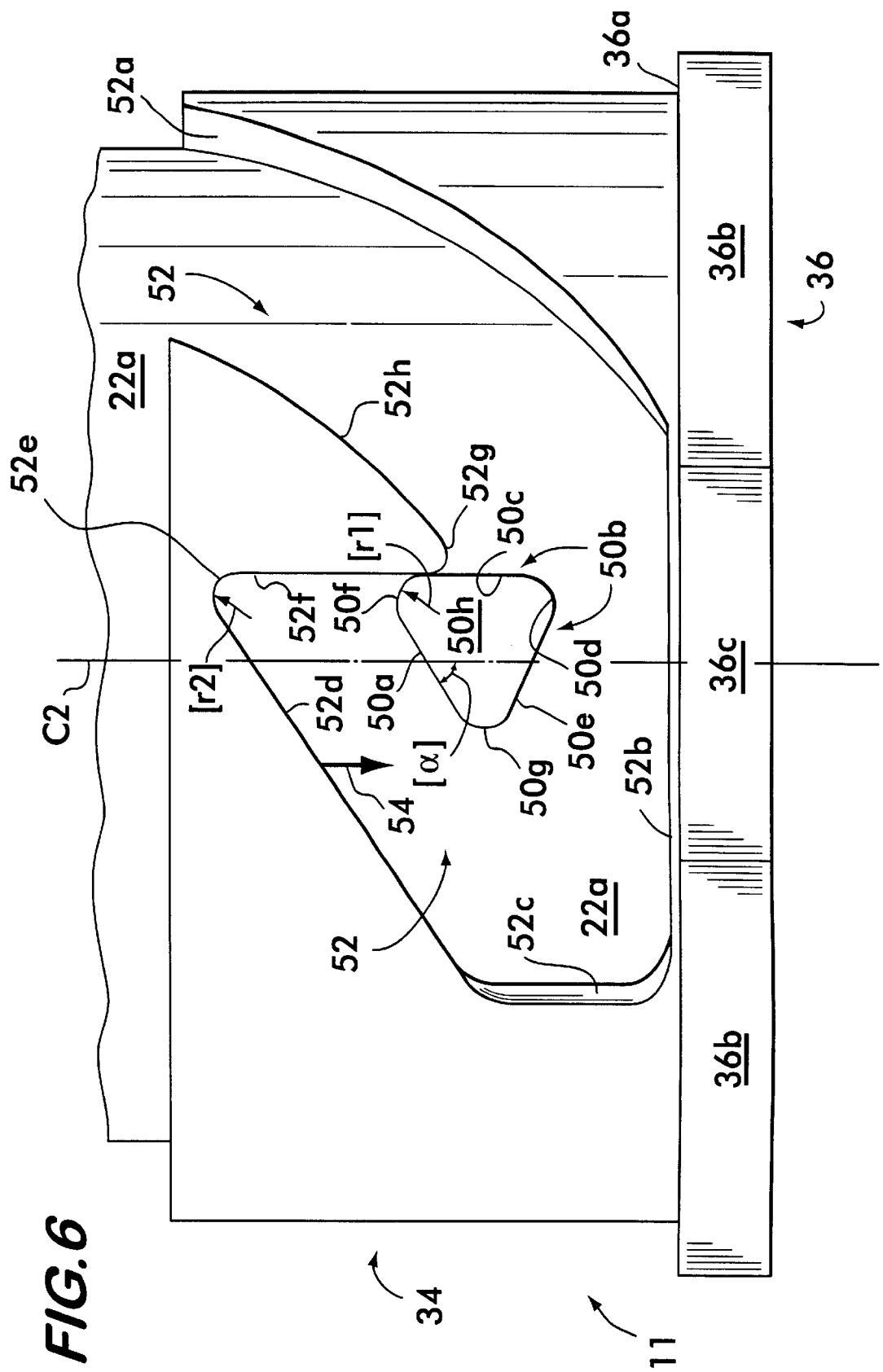

MECHANISM FOR RETAINING A REMOVABLE ELEMENT IN A MOUNTING STRUCTURE

FIELD OF THE INVENTION

The present invention relates generally to chip detectors, and more particularly to an improved retaining mechanism that is especially well suited (although not limited) for use in chip-detector applications.

BACKGROUND OF THE INVENTION

Bearing and gear failures within gas turbine engines, helicopter gear boxes, and many other types of machinery are typically preceded by the production of wear-related debris. Such debris is usually produced well in advance of a catastrophic failure of a defective component. The wear debris is typically carried by the machine's lubricating oil toward a sump or a filter within the machine. The debris can be intercepted and collected by a chip detector as it is being transported in this manner. Periodic inspection of the chip detector can thus provide an indication of an impending component failure.

Two types of chip detectors are commonly used: magnetic plugs (also referred to as "chip collectors") and electric chip detectors. Chip collectors include a magnetic probe mounted inside a self-closing valve. The magnetic probe is periodically removed from the host machine, i.e., the machine in which the chip detector is utilized, and visually inspected for any accumulation of debris. The self-closing valve inhibits the leakage of lubricating oil from the host machine when the probe is removed for inspection. Inspection intervals usually range from 50 to 200 operating hours. This interval may be shortened when wear debris begins to appear on the probe.

Electric chip detectors also collect wear debris. In addition, electric chip detectors provide an external, electrically-generated indication of the presence of such debris. Electric chip detectors do not require inspection at pre-determined intervals. These types of chip detectors are usually removed and inspected whenever an external signal (a so-called "chip light") has been activated. Electric chip detectors, like chip collectors, usually have a self-closing valve that permits withdrawal of the magnetic probe with little or no loss of lubricating oil.

Many types of machines utilize separate bearing compartments, gear boxes, and gear modules. Such machines often incorporate multiple chip detectors to identify the location of an incipient component failure. This methodology allows a defective component or module to be replaced (as opposed to replacing the entire machine). The regular inspection of multiple chip detectors can be a time consuming maintenance requirement if the detectors are not specifically designed for quick removal and reinstallation.

Chip-detector probes are commonly mounted using a quick-disconnect, bayonet-type locking mechanism. Bayonet-type locks typically comprise two or three locking pins disposed on a surface of the probe. The pins engage an equal number of grooves formed in a housing fixed to the host machine. The grooves terminate in detents. The probe installation process involves pushing the probe into the housing against a spring force, and then twisting the probe so that the pins engage the helical grooves. The spring subsequently locks the probe in place by urging the pins into the detents.

Bayonet-type locking mechanisms have a number of serious shortcomings that have subjected aircraft to costly and potentially dangerous service disruptions, e.g., in-flight engine shutdowns. One such shortcoming involves excessive wear of the pins and grooves that retain the probe. This problem stems from the limited contact area of the pins. More particularly, the relatively small pins concentrate the probe retention forces over a very limited area, i.e., about one-half of the circumference of the pins. This force concentration, combined with the vibration normally generated by most machinery, causes substantial wear in the pins and the grooves. Such wear has caused pin and groove failures in extreme cases, leading to ejection of the chip detector and an ensuing loss of lubricating oil.

Bayonet-type locks also present manufacturing-related drawbacks. Specifically, the retaining pins are typically pressed into a portion of the probe. The pins are often staked, i.e., mechanically deformed, after the pressing operation to further secure the pins in place. The pressing operation usually induces high stresses around the pin holes. These stresses, if excessive, can cause the material around the pin holes to yield, resulting in a loss of the press fit and a potential liberation of the pin. Furthermore, the staking operation cannot be controlled with a high degree of precision, and the results of the staking operation are not easily inspected. Hence, the use of press-fit retaining pins presents quality-control issues. Furthermore, press-fit pins increase the overall parts count of the chip detector.

Bayonet-type locks also present operational disadvantages. Specifically, a bayonet lock does not provide a direct visual indication that the locking means have fully and properly engaged. This disadvantage stems from the fact that the retaining pins and grooves are not visible to the installer of the probe, i.e., the bayonet plug is a so-called "blind assembly." This characteristic increases the possibility of an in-flight loss of the probe due to improper installation. Furthermore, the grooves of a typical bayonet-type lock cannot be easily inspected when the housing is installed in the host machine. In particular, the contact between the pins and the grooves is usually borne by the underside of the groove. This portion of the groove cannot be directly viewed by maintenance personnel. Hence, a proper inspection of the housing requires removal of the housing, or the use of mirrors or other devices that provide a visual image of the underside of the groove.

Blade-type locks are another type of mechanism commonly used to mount and secure chip-detector probes. Blade-type locks incorporate a pair of thin and substantially flat retaining members, or blades, fixed to the probe. Each blade engages a corresponding slot machined into the probe housing, thereby securing the probe to the housing.

Blade-type locks are subject to the above-noted operational disadvantages associated with bayonet plugs, i.e., no direct visual indication that the locking means have fully and properly engaged, and relatively difficult inspection procedures. Furthermore, the slots of a blade-type lock cannot be formed at an oblique angle in relation to the probe centerline without considerable difficulty or expense. Hence, the blades cannot be angled relative to the probe centerline. This limitation prevents the blade-type lock from being configured to automatically eject the probe from the housing in the event of improper, i.e., incomplete, installation (the relationship between an angled retaining means and probe ejection is explained in detail below).

The above-described problems have been apparent for many years. Thus, a long-felt need exists for a chip-detector locking mechanism that provides a direct visual indication that the locking means have fully and properly engaged. The locking mechanism should be capable of being inspected a minimal amount of effort. In addition, the locking mechanism should eject the probe automatically if the probe is not completely installed in its housing. Furthermore, the locking mechanism should be resistant to vibration-induced wear. The locking mechanism should provide these advantages without adding substantially to the parts count or the manufacturing complexity of the chip detector.

SUMMARY OF THE INVENTION

In its presently preferred from, the invention disclosed herein solves the above-described problems with the prior art. In general, the invention provides a mechanism for retaining a removable element in a mounting structure. An exemplary embodiment of the invention is presented in the form of a chip detector. In the exemplary embodiment, the mounting structure is a gas turbine engine and the removable element is a probe. The probe has a magnet for collecting wear debris. The chip detector also comprises a housing that removably receives the probe. The housing is fixedly attached to the engine. The probe is exposed to a stream of lubricant within the engine when the probe is installed in the housing.

The housing includes a locking portion. Two lugs are disposed along an outer surface of the locking portion. Each lug has a first sidewall and a second sidewall. The first sidewall is disposed at an oblique angle in relation to an axial (longitudinal) centerline of the housing. The probe comprises a locking portion that defines a pair of slots. The slots include a first contact surface and a second contact surface. The first contact surface has a profile and an orientation substantially identical to the profile and orientation of the first sidewall.

The probe is manually installed in the housing. The housing locking portion slidably engages the probe locking portion as the probe is inserted into the housing in an axial direction. In particular, each lug engages a corresponding slot as the probe nears the end of its axial travel within the housing. When the probe has been fully inserted in the axial direction, the probe is rotated so as to align the first contact surface of each slot with the first sidewall of the corresponding lug. The geometric configuration of the slots prevents the probe from being rotated in this manner unless the probe has been completely inserted in the axial direction.

The probe is released when the lugs and the first contact surfaces have been aligned as noted. Upon release of the probe, a spring disposed within the housing urges the first contact surface of the slot into contact with the first sidewall of the lug. The spring bias also urges the second contact surface of the slot into contact with the second sidewall of the lug. The angled orientation of the first sidewall causes the sidewall to restrain the lug against both axial and clockwise rotational movement. The axial restraint prevents the probe from backing out of the housing. The contact between the second sidewall and the second contact surface restrains the lug from counterclockwise rotational movement. Hence, the probe is fixed securely within the housing.

The geometry of the probes and the slots, in conjunction with the spring bias, prevent the probe from remaining in the housing if the probe has not been properly installed. More particularly, the spring bias urges the probe away from the housing unless the probe and the lug have engaged in the above-noted manner. The angled orientation and substantially smooth profile of the first sidewall allow the slots to slide along the first sidewall, thereby preventing the slots from fixedly engaging the lugs. Hence, the probe is ejected from the housing when the probe has not been properly installed.

BRIEF DESCRIPTION OF THE DRAWINGS

The foregoing summary, as well as the following detailed description of a presently preferred embodiment, is better understood when read in conjunction with the appended drawings. For the purpose of illustrating the invention, the drawings show an embodiment that is presently preferred. The invention is not limited, however, to the specific instrumentalities disclosed in the drawings. In the drawings:

FIG. 6 is a diagrammatic top view of a probe locking portion and a housing locking portion of the chip detector assembly of FIG. 1 in a partially-installed position.

DETAILED DESCRIPTION OF PREFERRED EMBODIMENTS

The present invention provides an improved mechanism for retaining a removable element in a mounting structure. A preferred embodiment of the invention is described in connection with a magnetic chip detector installed in a lubrication system for a machine such as a gas-turbine engine. This embodiment is presented for exemplary purposes only. Accordingly, the invention should not be limited to the particular embodiment shown, as the invention can be applied to other types of elements adapted for installation in and removal from another structure or element.

Figure 1:
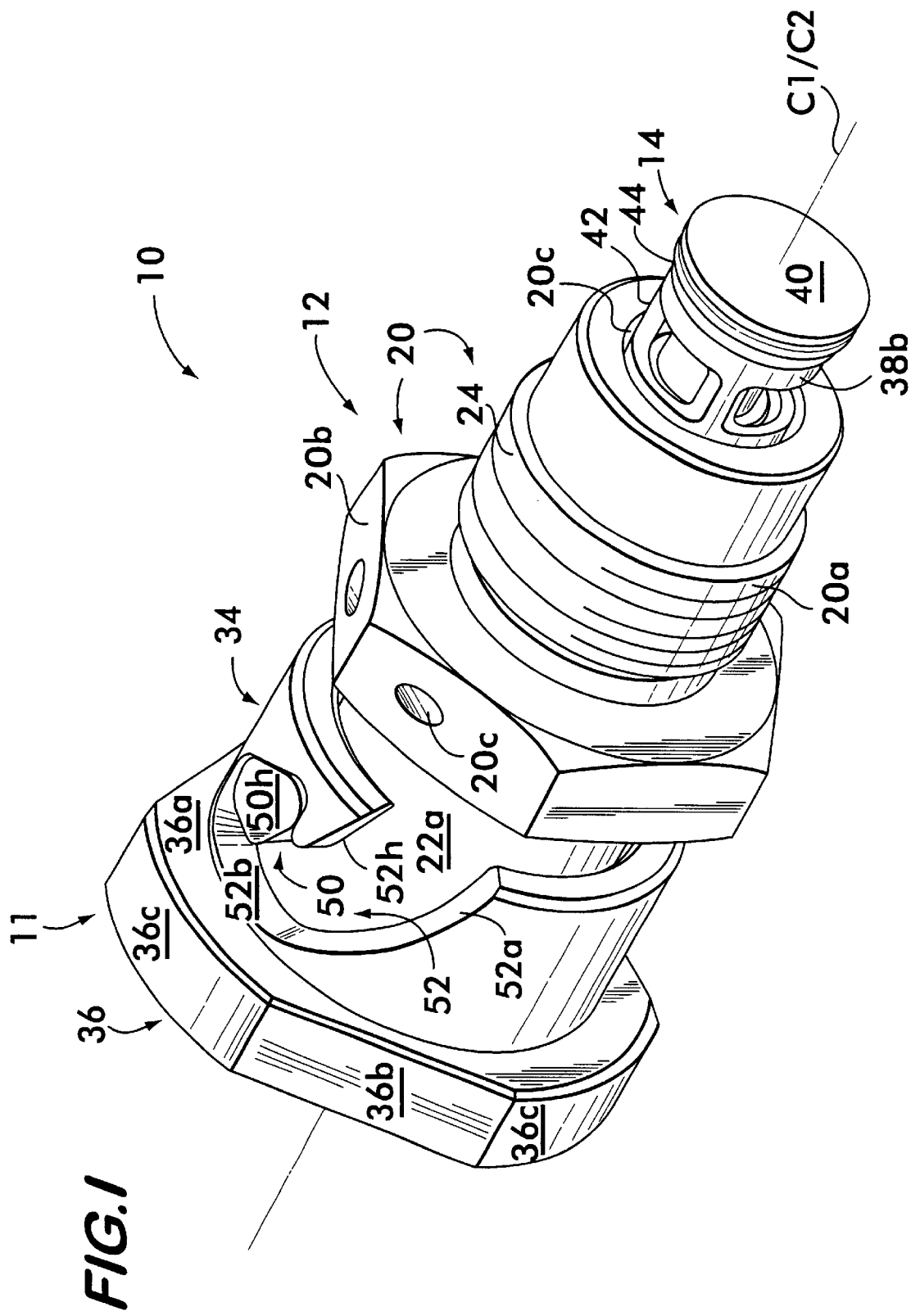
FIG. 1 is an isometric view of a chip detector assembly that incorporates the present invention.
Figure 2:
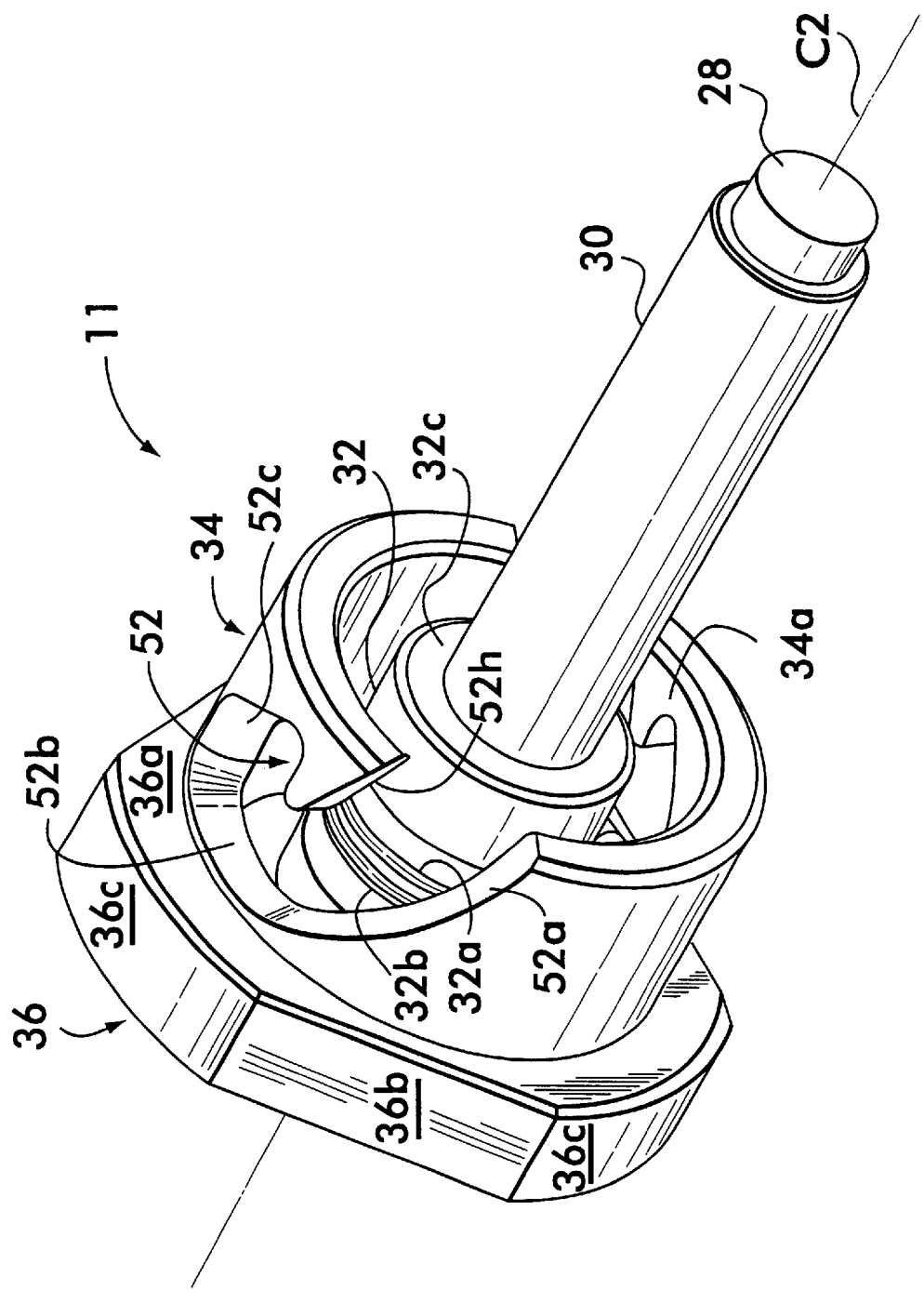
FIG. 2 is an isometric view of a probe of the chip detector assembly of FIG. 1.
Figure 3:
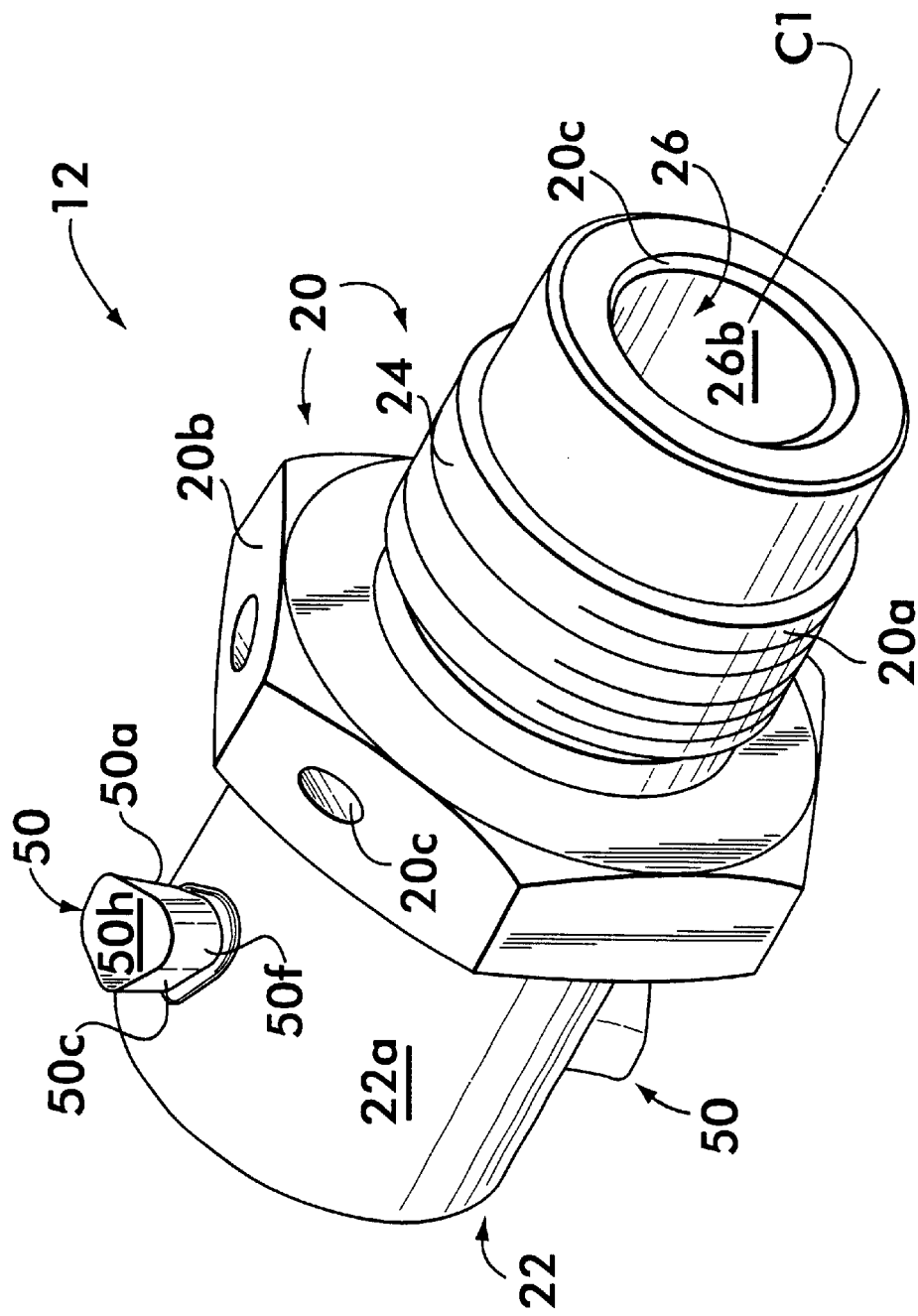
FIG. 3 is an isometric view of a housing of the chip detector assembly of FIG. 1.
Figure 4:
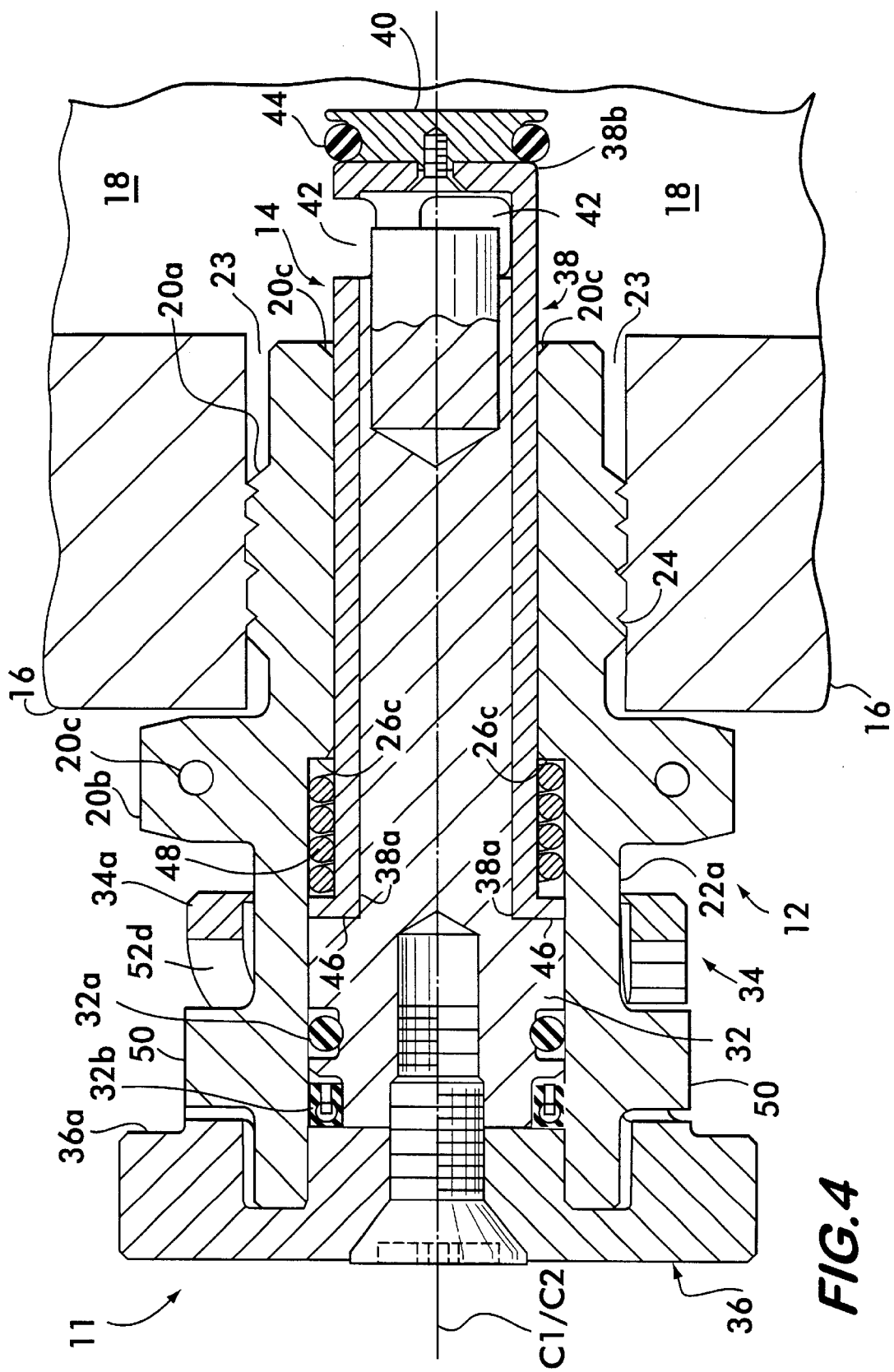
FIG. 4 is a cross-sectional view of the chip detector assembly of FIG. 1.

A preferred embodiment of a chip-detector assembly 10 is illustrated in FIGS. 1 through 6a. The chip detector assembly 10 comprises a probe 11, a housing 12, and a self-sealing valve 14. The housing 12 and the valve 14 are mounted in a machine structure 16 that surrounds a lubrication passage 18, as shown in FIG. 4. The structure 16 and the lubrication passage 18 may be part of an engine, transmission, or other machine in which a lubricating fluid is circulated or stored. The machine in which the chip detector 10 is installed is hereinafter referred to as a "host machine."

The housing 12 comprises a mounting portion 20 and a locking portion 22. The mounting portion 20 preferably includes a contact surface 20a and a hexagonal surface 20b. The contact surface 20a is disposed in a receptacle 23 in the structure 16, thereby coupling the housing 12 to the host machine. The contact surface 20a (and the housing 12) can be secured by way of threads 24 disposed on the surface 20a. Alternatively, the mounting portion 20 may comprise a flange (not shown) that is fixed to the structure 16 using threaded fasteners. The hexagonal section 20b includes a plurality of through holes 20c. The through holes 20c accommodate locking wire (not shown) that secures the housing 12 in place upon installation.

Figure 5:
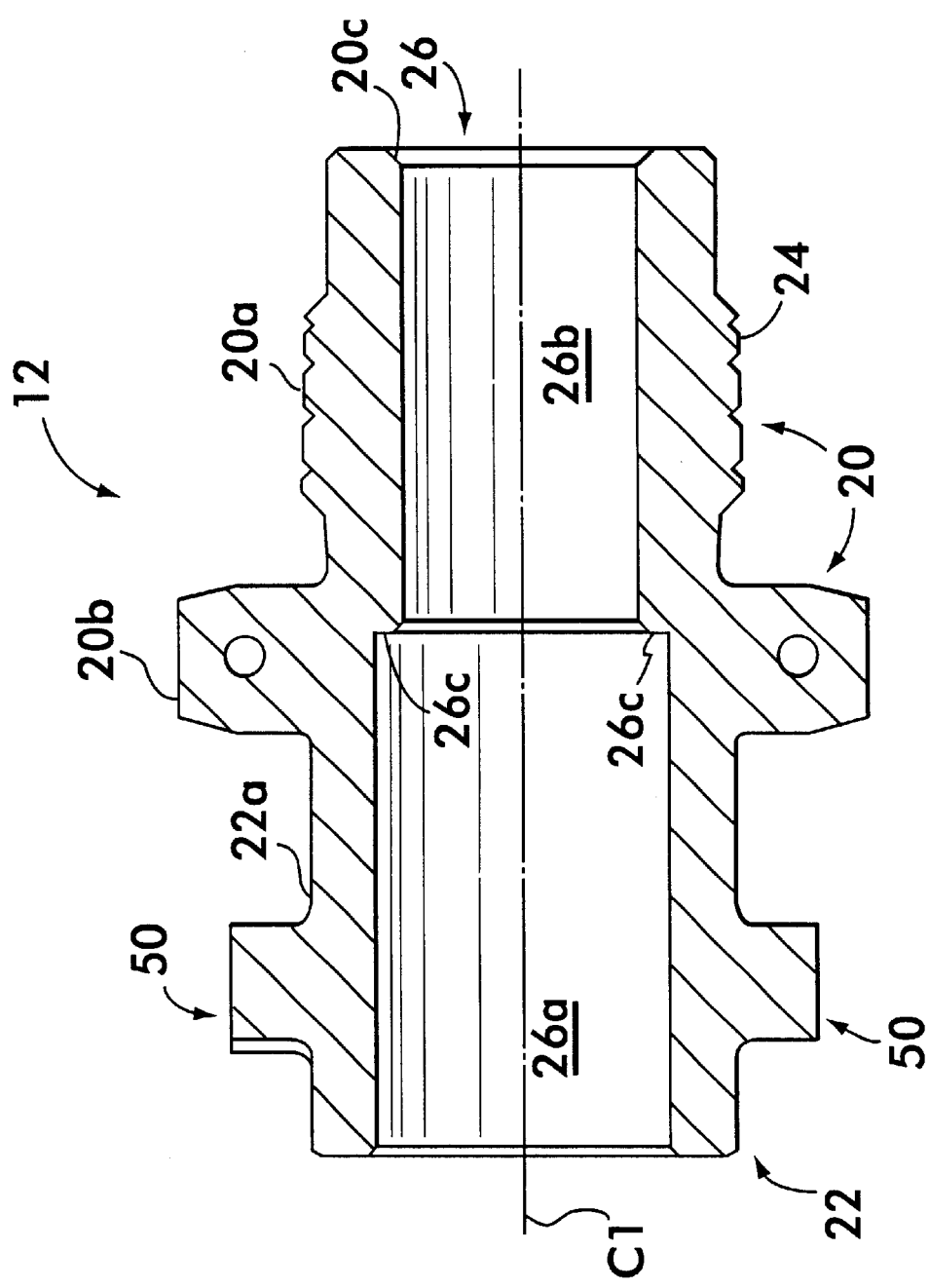
FIG. 5 is a cross-sectional view of a housing of the chip detector assembly of FIG. 1.

The mounting portion 20 and the locking portion 22 define a center hollow 26, as is most clearly shown in FIGS. 3 and 5. The hollow 26 is centered along a longitudinal centerline C1 of the housing 12, and traverses the entire length of the housing 12. The hollow 26 includes an upper portion 26a and a lower portion 26b. The diameter of the upper portion 26a is larger than the diameter of the lower portion 26b, as is evident in FIG. 5. Furthermore, the transition point between the upper and lower portions 26a and 26b defines a step 26c. The significance of these features is explained in detail below.

The probe 11 includes a magnet 28, a shaft 30, a sealing portion 32, a locking portion 34, and a grip 36. These features are best shown in FIG. 2. The sealing portion 32 and the locking portion 34 are located on an inner surface 36a of the grip 36. The sealing portion 32 is concentrically disposed within the locking portion 34. An opposing end of the sealing portion 32 is coupled to the shaft 30. The magnet 28 is disposed on an end of the shaft 30 opposite the sealing portion 32. An O-ring seal 32a and a spring-loaded seal 32b are disposed on an outer circumference of the sealing portion 32. An outer circumference of the grip 36 preferably comprises three substantially flat portions 36b and three arcuate portions 36c. The probe 11 defines a longitudinal centerline C2.

The probe 11 is disposed within the housing 12 when the chip detector 10 is fully assembled. More particularly, the sealing portion 32 and the shaft 30 are disposed within the hollow 26 when the detector 10 is assembled. Furthermore, the shaft 30 is dimensioned so as to cause the magnet 28 to protrude into the lubrication passage 18 when the probe 11 is fully inserted in the housing 12. The magnet 28 is thus exposed to a stream of lubricating fluid, thereby causing the magnet 28 to attract and retain ferrous particles suspended in the lubricant stream.

The self-sealing valve 14 inhibits the leakage of lubricant from the passage 18 when the probe 11 is removed from the housing 12. The valve 14 comprises a cylindrical portion 38 having an upper end 38a and a lower end 38b. The valve 14 also includes a flat 40 fixed to the lower end 38b. The cylindrical portion 38 is slidably disposed within the center hollow 26 of the housing 12, as shown in FIG. 4. The cylindrical portion 38 has an outer diameter approximately equal to the diameter of the lower portion 26b of the hollow 26. A plurality of penetrations 42 are formed in the cylindrical portion proximate the lower end 38b. An O-ring seal 44 is disposed around an outer circumference of the cylindrical portion 38, between the penetrations 42 and the flat 40.

A lip 46 is integrally formed around the upper end 38a of the cylindrical portion 38, as is most clearly seen in FIG. 4. The lip 46 has an outer diameter approximately equal to the diameter of the upper portion 26a of the center hollow 26. A spring 48 is positioned around the outer circumference of the cylindrical portion 38, between the lip 46 and the step 26c (see FIG. 4). The spring 48 engages the lip 46 and the step 26c, and thereby biases the cylindrical portion 38 upward. (Throughout this specification, the terms "upward" and "downward" refer respectively to axial (longitudinal) directions away from and toward the lubrication passage 18.) The spring bias causes the flat 40 to abut a lower surface 20c of the locking portion 20 when the probe 11 is not installed in the housing 12. Hence, the penetrations 42 are positioned within the lower portion 26b of the hollow 26, and the O-ring seal 44 engages the inner circumference of the lower portion 26b when the probe 11 is removed from the housing 12. These features inhibit the leakage of lubricant from the passage 18 when the probe 11 is removed for inspection.

Insertion of the probe 11 into the housing 12 causes a lower surface 32c of the sealing portion 32 to abut the lip 46 of the cylindrical portion 38, as shown in FIG. 4. Continued insertion of the probe 11 thus forces the valve 14 downward. This movement drives the penetrations 42 into the passage 18. As noted previously, the shaft 30 of the probe 11 is dimensioned so as to cause the magnet 28 to protrude into the lubrication passage 18 when the probe 11 is fully inserted in the housing 12. More particularly, the magnet 28 is disposed proximate the penetrations 42 of the cylindrical portion 38 when the chip detector 10 is configured in this manner. Hence, the magnet 28 is exposed to the lubricant stream within the passage 18 by way of the penetrations 42. Furthermore, the O-ring seal 32a and the spring-loaded seal 32b engage the inner circumference of the housing locking portion 22 when the probe 11 is fully inserted in the housing 12. This feature prevents the leakage of lubricant between the probe 11 and the housing 12.

Specific details of the locking features of the chip detector assembly 10 are as follows. The locking portion 22 of the housing 12 and the locking portion 34 of the probe 11 provide positive retention of the probe 11 within the housing 22. This retention is provided by a pair of lugs 50 that project from an outer surface 22a of the housing locking portion 22. The lugs 50 are disposed in diametrically opposite positions on the outer surface 22a. The lugs 50 are preferably formed as an integral part of the housing 12. The term "integral," as used in this context throughout the specification and claims, means that the lugs 50 and the housing 12 are machined as a single piece (as opposed to forming the lugs 50 and the housing 12 separately, and then attaching the lugs 50 to the housing 12).

The lugs 50 engage a corresponding pair of slots 52 defined by the probe locking portion 34. As explained in detail below, the interlocking geometry of the lugs 50 and the slots 52 prevents the lugs 50 and the slots 52 from disengaging when subject to shock or vibration. More specifically, the lugs 50 and the slots 52 are disengaged by a specific sequence of manual actions described below.

The lugs 50 are shown in detail in FIG. 6. As the lugs 50 are substantially identical, references throughout the specification to a single lug 50 pertain equally to both lugs 50, unless otherwise noted. Each lug 50 includes a forward sidewall 50a and an opposing rearward sidewall 50b. The rearward sidewall 50b has a first elongated portion 50c and an adjoining curvilinear portion 50d. The sidewall 50b also includes a second elongated portion 50e that adjoins the curvilinear portion 50d. (The designations "forward" and "rearward," as used in this context, are arbitrary and are utilized for illustrative purposes only.)

Each lug 50 further comprises a first curvilinear sidewall 50f and a second curvilinear sidewall 50g. The first curvilinear sidewall 50f adjoins the forward sidewall 50a and the portion 50c of the rearward sidewall 50b. The second curvilinear sidewall 50g adjoins the forward sidewall 50a and the portion 50e of the rearward sidewall 50b. Hence, the forward sidewall 50a opposes the rearward sidewall 50b. Each lug 50 also includes an upper surface 50h.

The slots 52 are also shown in detail in FIG. 6. As the slots 52 are substantially identical, references throughout the specification to a single slot 52 are equally applicable to both slots 52, unless otherwise noted. Each slot 52 is defined by a plurality of surfaces integrally formed in the probe locking portion 34. Theses surfaces include a first ramp 52a, a circumferential flat 52b, an axial flat 52c, a primary contact surface 52d, a fillet 52e, a secondary contact surface 52f, a curvilinear surface 52g, and a second ramp 52h.

The relative orientations of the surfaces 52a through 52h are most clearly shown in FIG. 6. As is evident from the figure, the circumferential flat 52b adjoins the ramp 52a and the axial flat 52c. The ramp 52a is spaced apart from and opposes the axial flat 52c. The primary contact surface 52d adjoins the axial flat 52c and the fillet 52e. The primary contact surface 52d is spaced apart from and opposes the circumferential flat 52b. The secondary contact surface 52f adjoins the fillet 52e and the curvilinear surface 52g. The curvilinear surface 52g is spaced apart from and opposes the circumferential flat 52b. The second ramp 52h adjoins the curvilinear surface 52g, and is spaced apart from and opposes the first ramp 52a.

The probe 11 is manually installed in the housing 12. The installation process proceeds as follows. The installer initially aligns the magnet 28 and the shaft 30 with the upper portion 26a of the center hollow 26. The installer simultaneously aligns each slot 52 with a corresponding lug 50. More particularly, the installer aligns a portion of the slot 52 located between the first and second ramps 52a and 52h with a corresponding lug 50. The probe is subsequently urged downward by the application of axial force to the grip 36. As noted previously, insertion of the probe 11 into the housing 12 causes the lower surface 32c of the sealing portion 32 to abut the lip 46 of the cylindrical portion 38. Further insertion of the probe 11 causes the spring 48 to compress. Hence, an increasing amount of downward force is required to overcome the counteracting spring force as the probe 11 is inserted further into the housing 12.

An inner surface 34a of the probe locking portion 34 slidably engages the outer surface 22a of the housing locking portion 22 as the probe 11 is urged downward. Furthermore, each lug 50 contacts the ramp 52a of the corresponding slot 52 during the downward movement of the probe 11. As is evident in the figures, the ramps 52a have a substantially arcuate shape. Hence, the contact between the lugs 50 and the ramps 52a, in conjunction with the axial translation of the probe 11, causes the probe 11 to rotate about the probe centerline C2 in a clockwise direction. (Throughout this specification, the terms "clockwise" and "counterclockwise" correspond to a perspective looking downward, toward the host machine.)

The probe 11 is urged downward until the curvilinear surface 52g of the locking portion 34 clears, i.e., reaches an axial position below, the curvilinear sidewall 50f of the lug 50. The probe 11 is fully inserted in the axial direction at this point. The installer next exerts a clockwise torque on the grip 36, thereby imparting a further rotational movement to the probe 11. This movement aligns the forward sidewall 50a of each lug 50 with the primary contact surface 52d of each slot 52.

Figure 6A:
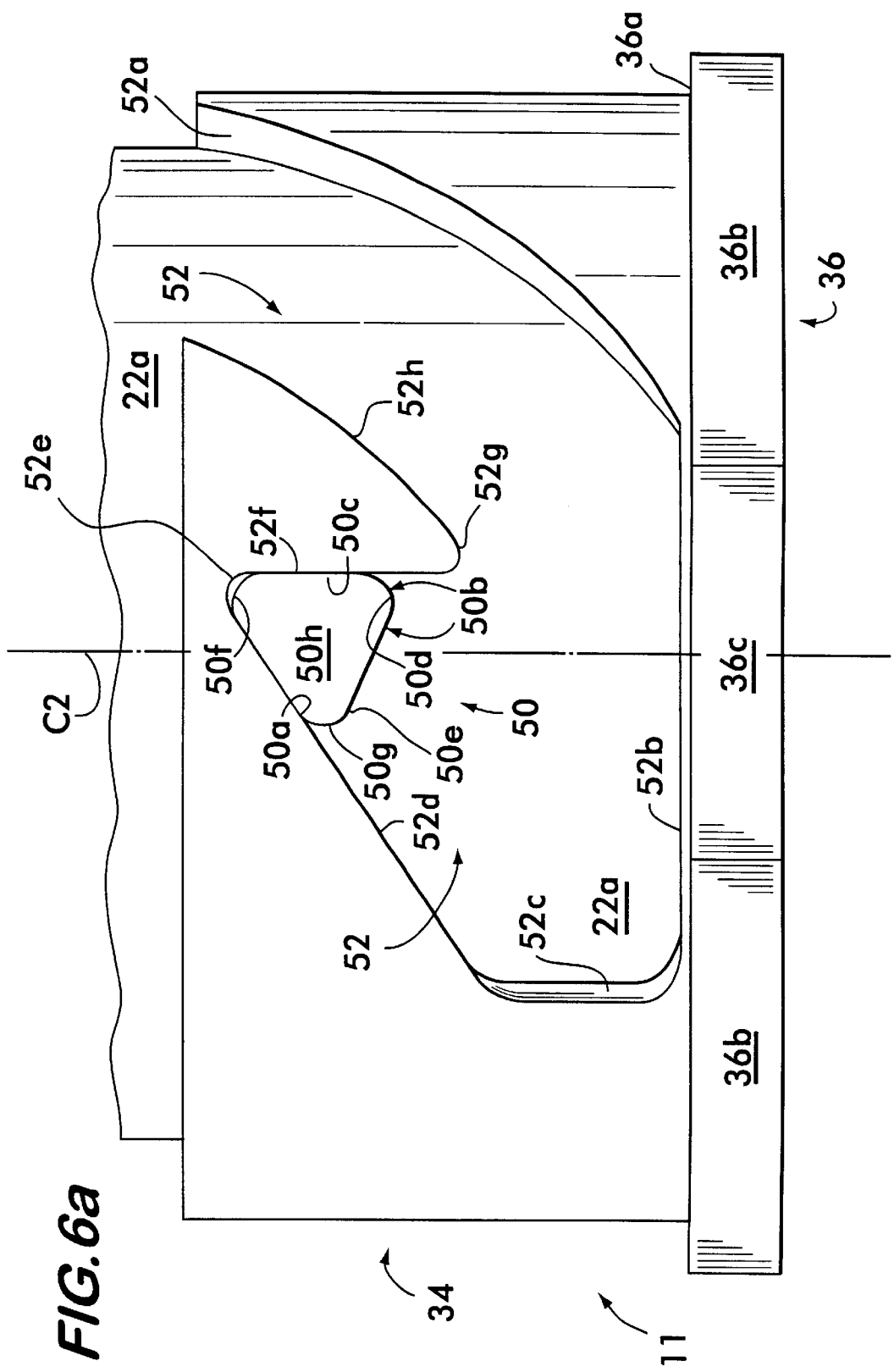
FIG. 6a is a diagrammatic top view of a probe locking portion and a housing locking portion of the chip detector assembly of FIG. 1 in a fully-installed position.

The installer releases the grip 36 when an entirety of the sidewall 50a is aligned with the primary contact surface 52d (as shown in FIG. 6). Releasing grip 36 causes the probe 11 to assume its installed (locked) position. More particularly, release of the grip 36 causes the probe locking portion 34 to translate upward (in the direction shown by the arrow 54 in FIG. 6) due to the bias of the spring 48. This upward translation causes the primary contact surface 52d to abut the forward sidewall 50a. Furthermore, the elongated portion 50c of the rearward sidewall 50b abuts the secondary contact surface 52f of the corresponding slot 52. FIG. 6a illustrates the probe locking portion 34 in its installed position.

The contact between the probe sidewalls 50a and 50b and the slot contact surfaces 52d and 52f prevents the probe 11 from separating from the housing 12. Specifically, the angled orientation of the forward sidewall 50a causes the sidewall 50a to exert a force having both an axial and a circumferential component. The axial component acts on the primary contact surface 52d in a downward direction, and thereby counteracts the upward force produced by the spring 48. The circumferential component acts on the primary contact surface 52d in a counterclockwise direction. This component is counteracted by a circumferential force exerted by the portion 50c of the sidewall 50b on the contact surface 52f. Hence, the probe locking portion 34 (and the probe 11) are restrained from both axial and circumferential translation by the lugs 50.

The geometric relationship between the lugs 50 and the slots 52 causes the probe 11 to be ejected from the housing 12 when the probe 11 has not been fully inserted in the housing 12. More particularly, the second ramp 52h and the curvilinear surface 52g prevent the probe 11 from rotating to its locked position unless the probe 11 is filly inserted in the axial direction. Furthermore, the upward bias of the spring 48, in conjunction with the angled orientation of the forward sidewall 50a of the lug 50, cause the curvilinear surface 52g (and the locking portion 34) to slide upward along the forward sidewall 50a if the probe 11 has not been fully rotated to its locked position. In addition, the curvilinear profile of the surface 52g prevents the probe 11 from being inadvertently placed in an angular position from which the probe locking portion 34 will neither slide down the sidewall 50a nor fully engage the lug 50. Hence, the housing locking portion 22a will not retain the probe locking portion 34 when the probe 11 has not been properly installed, and the bias of the spring 48 will force the probe 11 out of the housing 12.

Removal of the probe 11 is performed manually. Removal is effectuated by urging the probe 11 downward by applying a downward force on the grip 36. The probe 11 is rotated in a counterclockwise direction once the curvilinear portion 52g of the slot 52 reaches a point below the curvilinear sidewall 50f of the lug 50. When the curvilinear portion 52g has rotated past the sidewall 50f, the downward axial force is released and the bias of the spring 48 urges the probe 11 upward. The angled orientation of the forward sidewall 50a allows the curvilinear surface 52g to slide along the sidewall 50a until the probe locking portion 34 is clear of the housing locking portion 22a.

Further details concerning the lugs 50 and the slots 52 are as follows. In the exemplary embodiment, the forward sidewall 50a of the lug 50 has a substantially planar profile. Alternatively, the sidewall 50a can be formed with an arcuate profile. The choice of a particular profile involves a trade-off between ease of manufacture (planar profile) and increased restraining force in the angular direction (arcuate profile). The profile of the primary contact surface 52d of the slot 52 preferably matches the profile of the sidewall 50a, thereby maximizing the contact area between the two surfaces.

The sidewall 50a is disposed at an oblique angle in relation to the housing centerline C1. This angle is denoted as "$\alpha$" in FIG. 6. As noted above, the angled orientation of the sidewall 50a facilitates the ejection of the probe 11, i.e., the angled orientation of the sidewall 50a, in conjunction with the bias of the spring 48, causes the curvilinear surface 52g to slide in an upward direction along the sidewall 50a when the probe 11 is not disposed in its locked position. The angled orientation of the sidewall 50a also causes the sidewall 50a to restrain the probe 11 in both the axial and circumferential directions, as described in detail above.

The angle $\alpha$ is preferably between about twenty and forty degrees. The optimum value for $\alpha$ is a function of the spring constant of the spring 48 and the coefficient of friction between the curvilinear surface 52g and the sidewall 50a. In the exemplary embodiment, α is about thirty degrees, the spring constant is about six to fifteen pounds per inch, and the coefficient of friction is about 0.8.

The first curvilinear sidewall 50f defines a radius denoted "r1" in FIG. 6. The fillet 52e defines a radius denoted "r2." The radius r1 is preferably larger than the radius r2. This feature ensures that the forward sidewall 50a remains in contact with the primary contact surface 52d. Configuring the radius r2 smaller than the radius r1 would allow the curvilinear sidewall 50f to translate toward the center of the fillet 52e due to the bias of the spring 48, and due to torsional vibration of the probe 11 and the housing 12. Such translation will cause the sidewall 50a to move away from the contact surface 52d, thereby reducing the contact area between the locking portions 22a and 34.

Preferably, the curvilinear sidewalls 50f and 50g each subtend an arc of about 150 degrees, and the curved portion 50d of the rear sidewall 50b subtends an arc of about sixty degrees. Hence, the elongated portions 50c and 50e of the sidewall 50b are about equal in length. Furthermore, the portions 50c and 50e are each oriented at an angle of about thirty degrees in relation to the forward sidewall 50a. The elongated portions 50c and 50e thus extend away from the sidewall 50a, i.e., the distance between the portion 50c and the forward sidewall 50a increases as the portion 50c approaches the portion 50d, and the distance between the portion 50e and the forward sidewall 50a similarly increases as the portion 50e approaches the portion 50d. Hence, the sidewalls 50a and 50b are non-parallel. This characteristic increases the overall thickness of the lug 50 ("thickness," as used in this context, refers to the distance between the forward and rear sidewalls 50a and 50b.)

The exemplary lug 50 shown in the figures provides a tradeoff between ease of manufacture and load-bearing capacity. The shape of the lug 50 can be optimized for maximum load-bearing capacity using commonly-known stress-analysis techniques, e.g., finite-element analysis. In particular, variations in the relative orientation and length of the sidewall 50a and the elongated portions 50c and 50e that maximize the load-bearing capacity of the lug 50 are within the contemplated scope of the invention. Furthermore, the rear sidewall 50b may be formed as a substantially arcuate surface, as opposed to the combination of curvilinear and substantially flat surfaces of the exemplary embodiment.

The present invention provides numerous advantages in relation to common chip detectors. For example, the contact area between the locking surfaces of the probe 11 and the housing 22 is relatively large. In particular, the axial restraining force for the probe 11 is distributed over the relatively large forward sidewall 50a and the slot contact surface 52d. Distributing the restraining forces over a relatively large area minimizes wear on the contact surfaces, and thereby enhances the durability and life of the chip detector 10. Furthermore, any wear that does occur between the contact surfaces produces a more compliant fit between those surfaces due to the particular geometry of the lugs 50 and the slots 52. These characteristics represent a substantial advantage in relation to other type of restraints in which the contact forces are distributed over comparatively small areas, e.g., pin-type restraints.

Another advantage of the present invention pertains to the strength of the lugs 50. Specifically, the design of the lugs 50 provides the lugs with greater strength than other types of restraints having comparable contact areas. This advantage is a result of the comparatively large thickness of the lugs 50. For example, the average thickness of the lug 50 is substantially greater than the thickness of a blade-type restraint of comparable contact area. The relatively high strength of the lugs 50 enhances the durability and life of the chip detector 10.

The invention also provides manufacturing-related advantages. In particular, the lugs 50 can be integrally formed in the housing 12 (or, alternatively, in the probe 11). Forming the lugs 50 as an integral part of the housing avoids the typical problems associated with pressing the restraining means into the probe, e.g., stress concentration, insufficient quality control, increased parts count, etc.

The invention provides three-dimensional restraint of the probe 11 using two lugs 50. As noted above, the probe 11 is restrained from axial and rotational movement when the probe locking portion 34 is disposed in its locked position. Furthermore, the housing 12 prevents the probe 11 from rocking. More particularly, the probe 11 is restrained from rotating about an axis formed by a line that intersects the center of the top surface 50h of each lug 50. This restraint is provided by the relatively large contact area between the lugs 50 and the slots 52. Hence, the probe 11 can be adequately restrained through the use of two lugs 50. The invention thus provides advantages relating to manufacturing complexity and parts count in comparison to other types of retaining means that require three or more contact surfaces to provide three-dimensional restraint, e.g., pin-type restraints.

The configuration of the lugs 50 and the slots 52 can provide a direct visual indication that the probe 11 has or has not been fully and properly installed in the housing 12. More particularly, the lugs 50 are visible by way of the slots 52 when the probe 11 is installed in the housing 12. Hence, the installer of the probe 11 can visually confirm that the lugs 50 and the slots 52 have fully and properly engaged. This feature substantially reduces the possibility of an in-flight loss of the probe 11, and thus represents a significant advantage over, for example, chip detectors that utilize pin and blade-type restraints. Furthermore, the load-bearing surfaces of the lugs 50 and the slots 52 can be visually inspected without removing the housing 12 from the host machine, and without the use of vision-enhancing devices such as mirrors or borescopes. Hence, maintenance requirements for the chip detector 10 are simplified in relation to common chip detectors.

The probe 11 can self-eject from the housing 12 if the probe 11 has not been fully inserted and locked in the housing 12. This characteristic further reduces the possibility of an in-flight loss of the probe 11. The self-ejecting feature is a result of the angled orientation of the various contact surfaces of the probe 11 and the housing 12, as described in detail above. Hence, the self-eject feature cannot practically be incorporated into restraints, such as blade-type restraints, in which the contact surfaces cannot readily be disposed at an angled orientation.

It is to be understood that even though numerous characteristics and advantages of the present invention have been set forth in the foregoing description, together with details of the structure and function of the invention, the disclosure is illustrative only, and changes may be made in detail, especially in matters of shape, size, and arrangement of the parts, within the principles of the invention to the full extent indicated by the broad general meaning of the terms in which the appended claims are expressed. For example, in one possible variant within the contemplated scope of the invention, the lugs 50 may be disposed on the probe locking portion 34, and the slots 52 may be formed in the housing locking portion 22a. Furthermore, although the present invention has been described with reference to a chip detector 10, the invention can readily be applied to other types of elements adapted to be installed in and removed from another structure or element. For example, the invention can be applied to electrical connectors, caps for fluid reservoirs and passages, sensors, fasteners, etc. Furthermore, the invention can be used with mounting structures other than the gas turbine engine noted in the specification.

What is claimed is:

1. A quick-disconnect and locking mechanism, comprising (i) a first member comprising a locking portion having a slot formed therein, the slot extending through the locking member and being defined by a first contact surface and a second contact surface, and (ii) a second member that is capable of being coaxially coupled to the first member, the second member comprising a lug having a first, a second, a third, and a fourth sidewall, wherein the first sidewall is oblique to a longitudinal axis of the second member, the third and the fourth sidewalls each adjoin the first and the second sidewalls, the third and the fourth sidewalls are substantially curvilinear whereby the first sidewall opposes the second sidewall, the first contact surface abuts the first sidewall and the second contact surface abuts the second sidewall when the first member is fully and securely coupled to the second member, and the lug is retained in the slot when the first member is fully and securely coupled to the second member.

2. A chip detector, comprising a probe and a housing that is capable of being coaxially coupled to the probe, the housing receiving the probe in an axial direction, at least one of the probe and the housing comprising a lug having a first, a second, a third, and a fourth sidewall, the first sidewall being oblique to the axial direction, the third and the fourth sidewalls each adjoining the first and the second sidewalls, the third and the fourth sidewalls each being substantially curvilinear whereby the first sidewall opposes the second sidewall, and at least one of the probe and the housing comprising a locking portion having a first and a second contact surface defining a slot that extends through the at least one of the probe and the housing, wherein the first contact surface abuts the first sidewall and the second contact surface abuts the second sidewall when the probe is fully and securely coupled to the housing so that a visual indication is provided that the probe is fully and securely coupled to the housing.

3. A quick-disconnect and locking mechanism, comprising:
    a first member having a slot defined by a first and a second contact surface; and
    a second member capable of being coaxially coupled to the first member, the second member comprising a lug that is retained in the slot when the first member is fully and securely coupled to the second member, the lug having a first, a second, a third, and a fourth sidewall, the first sidewall being oblique to a longitudinal axis of the second member, the first contact surface abutting the first sidewall and the second contact surface abutting the second sidewall when the first member is fully and securely coupled to the second member, the third and the fourth sidewalls each adjoining the first and the second sidewalls and each being substantially curvilinear, whereby the first sidewall opposes the second sidewall.

4. A quick-disconnect and locking mechanism, comprising a first member and a second member adapted to receive at least a portion of the first member in an axial direction, wherein:
    at least one of the first and the second members comprises a locking portion having a first and a second contact surface;
    at least one of the first and the second members comprising a lug having a first, a second, a third, and a fourth sidewall, the first sidewall being oblique to the axial direction;
    the third and the fourth sidewalls each adjoin the first and the second sidewalls and the third and the fourth sidewalls are substantially curvilinear, whereby the first sidewall opposes the second sidewall; and
    the first contact surface abuts the first sidewall and the second contact surface abuts the second sidewall when the at least a portion of the first member is fully disposed within the second member, the abutment of the first contact surface and the first sidewall securely coupling the first member to the second member and the abutment of the second contact surface and the second sidewall preventing the first member from rotating in relation to the second member.

5. A chip detector, comprising a probe and a housing that is capable of being coaxially coupled to the probe, at least one of the probe and the housing comprising a lug having a first, a second, a third, and a fourth sidewall and at least one of the probe and the housing have a first and a second contact surface defining a slot, wherein:
    the housing receives the probe in an axial direction and the slot engages the lug when the probe is fully and securely coupled to the housing so that a visual indication is provided that the probe is fully and securely coupled to the housing;
    the first contact surface abuts the first sidewall and the second contact surface abuts the second sidewall when the probe is fully and securely coupled to the housing; and
    the first sidewall is oblique to the axial direction and the third and the fourth sidewalls each adjoin the first and the second sidewalls and are each substantially curvilinear, whereby the first sidewall opposes the second sidewall.

6. The quick-disconnect and locking mechanism of claim 3, wherein the first and the second sidewalls are non-parallel.

7. The quick-disconnect and locking mechanism of claim 3, wherein the first sidewall is substantially planar.

8. The quick-disconnect and locking mechanism of claim 3, wherein the slot is further defined by a fillet adjoining the first and the second contact surfaces, a curvilinear surface adjoining the second contact surface, an axial flat adjoining the first contact surface, a circumferential flat adjoining the axial flat, a first ramp adjoining the circumferential flat, and a second ramp adjoining the curvilinear surface, the first ramp being spaced apart from and opposing the second ramp and the axial flat, and the circumferential flat being spaced apart from and opposing the curvilinear surface and the first contact surface.

9. The quick-disconnect and locking mechanism of claim 3, wherein the first member is a probe and the second member is a housing.

10. The quick-disconnect and locking mechanism of claim 3, wherein the lug is integrally formed in the second member.

11. The chip detector of claim 5, wherein the slot is further defined by a fillet adjoining the first and the second contact surfaces, a curvilinear surface adjoining the second contact surface, an axial flat adjoining the first contact surface, a circumferential flat adjoining the axial flat, a first ramp adjoining the circumferential flat, and a second ramp adjoining the curvilinear surface, the first ramp being spaced apart from and opposing the second ramp and the axial flat, and the circumferential flat being spaced apart from and opposing the curvilinear surface and the first contact surface.

12. The chip detector of claim 5, further comprising a self-closing valve coupled to the housing.

13. The chip detector of claim 5, wherein the probe comprises a magnet.

14. The chip detector of claim 5, wherein the probe further comprises a shaft coupled to the magnet and a grip coupled to the shaft.

15. The chip detector of claim 5, wherein the lug is integrally formed in at least one of the probe and the housing.

16. The quick-disconnect and locking mechanism of claim 3, wherein the first and the second sidewalls are non-parallel.

17. The quick-disconnect and locking mechanism of claim 3, wherein the slot is further defined by a fillet adjoining the first and the second contact surfaces, a curvilinear surface adjoining the second contact surface, an axial flat adjoining the first contact surface, a circumferential flat adjoining the axial flat, a first ramp adjoining the circumferential flat, and a second ramp adjoining the curvilinear surface, the first ramp being spaced apart from and opposing the second ramp and the axial flat, and the circumferential flat being spaced apart from and opposing the curvilinear surface and the first contact surface.

18. The chip detector of claim 5, wherein the slot is further defined by a fillet adjoining the first and the second contact surfaces, a curvilinear surface adjoining the second contact surface, an axial flat adjoining the first contact surface, a circumferential flat adjoining the axial flat, a first ramp adjoining the circumferential flat, and a second ramp adjoining the curvilinear surface, the first ramp being spaced apart from and opposing the second ramp and the axial flat, and the circumferential flat being spaced apart from and opposing the curvilinear surface and the first contact surface.

* * * * *